United States Patent
Oudar et al.

(10) Patent No.: US 7,900,810 B2
(45) Date of Patent: Mar. 8, 2011

(54) SATURABLE ABSORBER COMPONENT AND METHOD FOR MANUFACTURING A SATURABLE ABSORBER COMPONENT

(75) Inventors: Jean-Louis Oudar, Chatenay Malabry (FR); Constantin Nelep, Clamart (FR); Houtai Choumane, Cachan (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 12/352,417

(22) Filed: Jan. 12, 2009

(65) Prior Publication Data
US 2009/0120997 A1    May 14, 2009

Related U.S. Application Data (63) Continuation of application No. 10/499,659, filed as application No. PCT/FR03/00169 on Jan. 20, 2003, now abandoned.

(30) Foreign Application Priority Data

Jan. 22, 2002   (FR) ..................................... 02 00756

(51) Int. Cl.
    *B23K 20/00*       (2006.01)
(52) U.S. Cl. ........................................................ 228/194
(58) Field of Classification Search .................... 228/194
    See application file for complete search history.

(56) References Cited

U.S. PATENT DOCUMENTS

| | | | |
|---|---|---|---|
| 5,493,577 A * | 2/1996 | Choquette et al. | 372/46.013 |
| 5,658,418 A | 8/1997 | Coronel et al. | |
| 5,835,521 A | 11/1998 | Ramani et al. | |
| 6,002,704 A | 12/1999 | Freitag et al. | |
| 6,061,378 A | 5/2000 | Marshall et al. | |
| 2002/0093108 A1 | 7/2002 | Grigorov | |
| 2002/0150129 A1 | 10/2002 | Coldren et al. | |
| 2003/0184837 A1 | 10/2003 | Marceaux et al. | |

FOREIGN PATENT DOCUMENTS

| | | |
|---|---|---|
| AU | 199952675 A1 | 4/2000 |
| EP | 0 736 791 A1 | 10/1996 |
| EP | 1 122 582 A2 | 8/2001 |
| JP | 9-244075 | 9/1997 |
| JP | 10-117016 | 5/1998 |
| JP | 10-142569 | 5/1998 |

(Continued)

OTHER PUBLICATIONS

U. Keller, et al., "Solid-state low-loss intracavity saturable absorber for Nd: YLF lasers: an antiresonant semiconductor fabry-perot saturable absorber", Optics Letter, vol. 17, No. 7, pp. 505-507, Apr. 1992.

(Continued)

*Primary Examiner* — Jessica L Ward
*Assistant Examiner* — Nicholas P D'Aniello
(74) *Attorney, Agent, or Firm* — Oblon, Spivak, McClelland, Maier & Neustadt, L.L.P.

(57) ABSTRACT

This invention relates to a saturable absorber component comprising an absorbent material located between a front mirror and a rear mirror as well as a method for manufacturing a saturable absorber component. The metallic rear mirror is a metallic buried mirror fixed via a welding joint on a heat conductive substrate. The invention applies to the field of high-rate optical transmission.

20 Claims, 9 Drawing Sheets

FOREIGN PATENT DOCUMENTS

| | | |
|---|---|---|
| JP | 2000-111965 | 4/2000 |
| JP | 2001-215542 | 8/2001 |
| JP | 2004-503803 | 2/2004 |
| WO | 01/59895 | 8/2001 |
| WO | 01/67563 | 9/2001 |
| WO | WO 02/05016 A2 | 1/2002 |

OTHER PUBLICATIONS

Ryo Takahashi, "Low-temperature-grown surface-reflection all-optical switch (LOTOS)", Optical and Quantum Electronics, No. 33, pp. 999-1017, Oct. 2001.

Leonard Berstein, "Semiconductor joining by the solid-liquid-interdiffusion (SLID) process", Journal of the Electrochemical Society, vol. 113, No. 12, pp. 1282-1288, 1996.

Chin C. Lee, et al. "Au-In bonding below the eutectic temperature" IEEE Transactions on Components, Hybrids, and Manufacturing Technology, vol. 16, No. 3, pp. 311-316, May 1, 1993.

J. Mangeney et al., "Ultrafast saturable absorption at 1.55 mu m in heavy-ion-irradiated quantum-well vertical cavity", Appl. Phys. Lett. 76, Mar. 2000, p. 1371-1373.

Zhigang Zhang et al., "Low-loss broadband semiconductor saturable absorber mirror for mode-locked Ti: sapphire lasers", Optics Communications vol. 176, Issues 1-3, Mar. 15, 2000, pp. 171-175 (http://www.sciencedirect.com/science/article/B6TVF-3YSXR7).

* cited by examiner

Fig. 19

SATURABLE ABSORBER COMPONENT AND METHOD FOR MANUFACTURING A SATURABLE ABSORBER COMPONENT

CROSS REFERENCES

This application is a Continuation of PCT application Ser. No. 10/499,659 filed Jun. 30, 2004 which is a National Stage of PCT/FR03/00169 filed Jan. 20, 2003 which claims priority to French Application No. 02 00756 filed Jan. 22, 2002, the entire contents of which are incorporated herein by reference.

TECHNICAL FIELD AND PRIOR ART

The invention relates to a saturable absorber component for the processing of digital optical signals as well as a method for manufacturing a saturable absorber component for the processing of digital optical signals.

The component according to the invention has particularly advantageous applications in the field of high-rate optical transmission (all-optical signal regeneration for transatlantic communication, modulation contrast amplification, wavelength conversion, temporal demultiplexing optical sampling, etc.).

Telecommunications and information technologies are currently booming. This growth in the exchange of information requires greater and greater transmission capacities.

In the case of optical signal transmission, the processing of information is done after converting an optical signal into an electrical signal. This conversion operation limits the processing capacities of the communication networks. It is thus necessary to increase the complexity of these networks in order to increase the quantity of processed information. To avoid this increase in complexity, it is indispensable to develop components capable of processing the optical signal in an "all-optical" manner, that meaning without having to convert the optical signal into an electrical signal.

Among the all-optical components the saturable absorber components are known. Generally speaking, a saturable absorber component has the following properties:
- a non-linear characteristic according to the amplitude or the signal phase (this property can be expressed, for example, by a threshold transfer function);
- a response time compatible with the rate of information, that meaning less than the bit time (inverse of the rate);
- a threshold power of the transfer function compatible with the signal strength.

Figure 1:
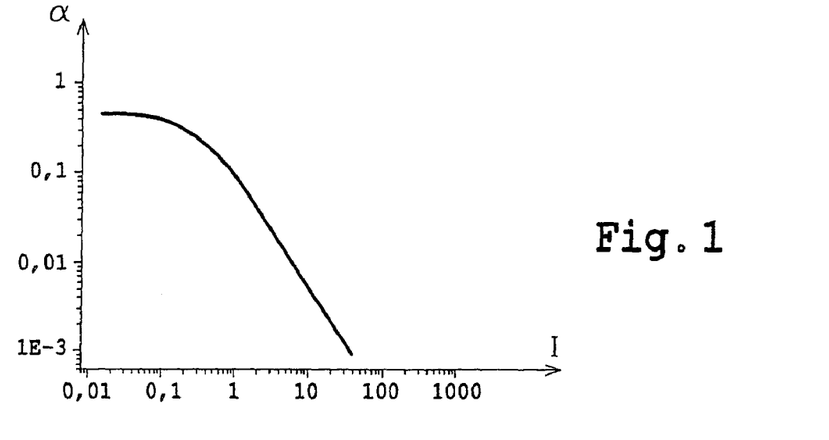
FIG. 1 represents the variation of the absorption coefficient α of a semiconductor material according to the intensity I of an incident signal which passes through it.

The functioning of a saturable absorber component is based on the absorption saturation phenomenon of semiconductor materials. The variation of the absorption coefficient α of a semiconductor material according to the intensity I of the incident signal that goes through it is represented in FIG. 1. The low intensity signals undergo the intrinsic absorption of the material and are consequently absorbed. On the other hand, high intensity signals reduce the semiconductor material absorption to a substantially nil value. This is the absorption saturation phenomenon. The high intensity signals are then transmitted without being absorbed.

Figure 2:
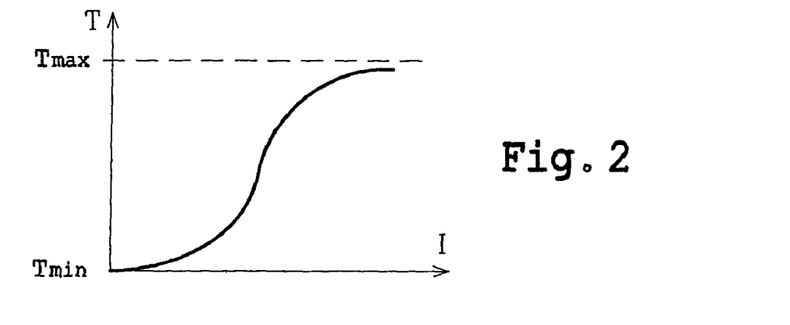
FIG. 2 represents the transfer function of a saturable absorbent material according to the intensity I of the incident signal which passes through it.

The transfer function of T of a saturable absorbent material according to the intensity I of the incident signal is represented in FIG. 2. The transfer function of T is a non-linear function of the intensity I. The material is opaque ($T=T_{min}$) at low intensity levels of the incident signal, for example the noise levels, and practically transparent ($T=T_{max}$) at high intensity levels, for example the "useful" signal levels. This defines the commutation contrast $T_{max}/T_{min}$.

Figure 3:
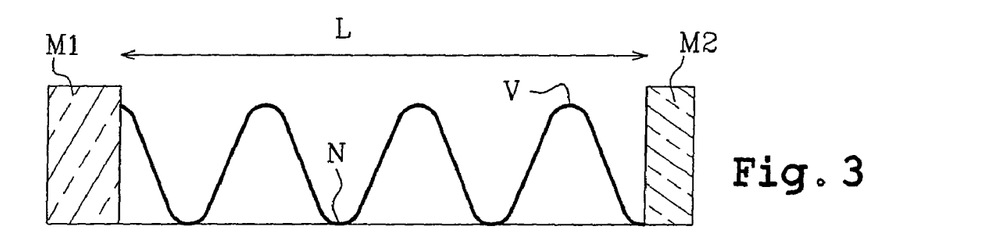
FIG. 3 represents a circuit diagram of a saturable absorber cavity.

In order to reinforce the non-linear effect and the commutation contrast, the saturable absorbent material can be placed in an asymmetric Fabry-Pérot cavity resonating to the operating wavelength. The cavity comprises two mirrors M1 and M2 of different reflectivities Rb and Rf separated by a distance L. Such a cavity is represented in FIG. 3. After several round tours of the cavity, a standing wave system is established with intensity nodes N and antinodes V. The coupling between the absorbent material and the incident light is thus reinforced on one hand by the multiple round tours, and on the other hand by placing the absorbent material at the antinodes of the standing wave.

A cancellation of the response of the component at weak signal rate, for example noise, can be obtained by creating destructive interference between the different beams reflected by the cavity. This cancellation is made via the following impedance adaptation condition:

$$R_f = R_b \cdot e^{-2\alpha_o L} \tag{1}$$

where
Rfb is the reflectivity of the front mirror,
Rb is the reflectivity of the rear mirror,
αo is the intrinsic absorption of the material, and
L is the absorber thickness in the cavity.

Different functions can be implemented using a saturable absorber cavity. A first function is the modulation contrast amplification in the case where only one signal is sent onto the cavity. Another function relates to the control of the optical door in the case where several signals are sent onto the cavity (a strong signal thus serves as a control signal so as to allow the transmission of low amplitude signals).

An advantageous characteristic of the saturable absorber cavities is that this type of component does not have any electrodes. This allows for extreme miniaturisation, a minimal dissipation of heat, and a very easy implementation as it is not necessary to envisage an electrical supply. These advantages are particularly beneficial in the case where we wish to handle several canals of different wavelengths, as these different canals can thus be handled in zones neighbouring a single cavity, with a space between the canals solely limited by the focusing conditions of the incident beams, whose diameter is typically about a few microns.

The creating of the impedance adaptation condition (see equation (1)) is indispensable in order to obtain optimal operating (high commutation contrast). A tolerance study on this condition shows that its creation is all the easier when the cavity is highly asymmetric (Rf greatly inferior to Rb). A high absorption is thus necessary in order to respect this condition. This results in a high absorbed power which has to be evacuated to avoid deteriorating the performance of the component.

Figure 4:
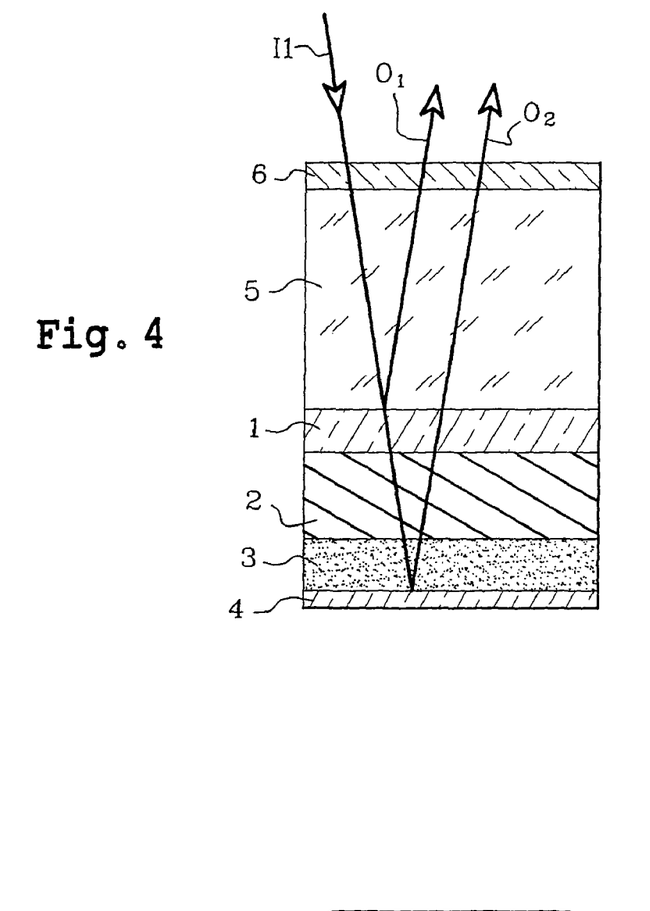
FIG. 4 represents a saturable absorber cavity according to the prior art.

A saturable absorber cavity according to the known art is represented in FIG. 4. This cavity is divulged in the document entitled "Low-temperature-grown-surface-reflexion all-optical switch (LOTOS)" by Ryo Takahashi, Optical and Quantum Electronics 33: 999-1017, 2001.

The cavity, highly asymmetric, comprises a front mirror 1 of very low reflectivity (typically of about 1%), an absorbent material 2 made of quantum wells constrained on a thickness of 4 μm, a phase control layer 3 (InAlAs/InP layer) and a high reflectivity rear metallic mirror in gold (Au) 4 (typically greater than 95%). The low reflectivity mirror 1 is covered in a growth substrate 5 on which is placed an anti-reflexion layer 6.

The growth of semiconductor layers is done at low temperature. The doping of the quantum wells is performed at the same time as their growth. High dosages of doping are necessary in order to reduce the response time. Each of these techniques (low-temperature growth and doping) deteriorate the non-linear properties of the absorbent material.

An incident light wave I1 which pierced the growth substrate 5 is partly reflected by the front mirror 1 in the form of a wave 01. The wave transmitted by the front mirror 1 performs a round tour in the cavity by being reflected by the rear mirror 4 in the form of a wave 02. During this round tour in the cavity, the wave 02 is partly absorbed by the absorbent material 2, then it is transmitted once again almost totally by the front mirror 1. To obtain the destructive interference (minimum of the reflectivity) the two waves must be equal in amplitude and opposite in phase.

This cavity has several inconveniences among which we can cite:
- the means of manufacturing which does not allow any control of the cavity parameters (a high tolerance design is thus indispensable, hence the choice of a highly asymmetric cavity ($R_f \ll R_b$)),
- a high value of power absorbed by the absorbent material due to the relatively significant thickness of the material (4 μm), so as to create the impedance adaptation condition (1);
- a poor evacuation of the absorbed power due to the fact that the rear mirror is in direct contact with the air which is a very poor heat conductor;
- a poor non-linear characteristic of the transfer curve of the absorbent material due to the necessary high dosages of doping as well as to the low-temperature growth;
- an impossibility of controlling the parameters which control the regulating of the component speed due to the fact that the doping of the quantum wells is performed during the growth of the wells;
- an obligation to use a transparent growth substrate due to the fact that the light must pass through the latter through its entire thickness before reaching the cavity.

Furthermore, as previously mentioned, destructive interference must be carried out between the signal that is reflected by the front mirror and the signal which, reflected by the rear mirror, passed through the entire structure. This destructive interference is created by setting the thickness of the phase control layer, before the depositing of the metallic mirror. Yet, the metallic mirror considerably phase shifts the light that it reflects. It follows that the subsequent depositing of the metallic mirror has a considerable risk of substantially modifying the state of the interference. The performance of the component can prove to be highly deteriorated.

The invention does not have these inconveniences.

PRESENTATION OF THE INVENTION

Indeed the invention relates to a saturable absorber component comprising an absorbent material located between a front mirror and a rear mirror. The rear mirror is a buried mirror fixed via a welding joint on a heat conductive substrate.

The invention also relates to a method for manufacturing a saturable absorber component comprising an absorbent material located between a front mirror and a rear mirror. The method comprises:
- the creating of a first structure via the depositing of a first metallic layer on a heat conductive substrate;
- the creating of a second structure comprising, on a growth substrate, the absorbent material and a second metallic layer;
- the bringing together of the first and second metallic layers; and
- the soldering via solid-liquid interdiffusion of the first and second metallic layers.

The component according to the invention advantageously ensures a very good evacuation of the absorbed power.

The method for manufacturing the component according to the invention advantageously allows to control the cavity parameters. An insignificantly thick absorbent material can thus be inserted in a cavity with a highly reflective front mirror. This greatly reduces the absorbed power and the heat effects.

BRIEF DESCRIPTION OF THE DRAWINGS

Other characteristics and advantages will appear upon reading a preferred embodiment of the invention made in reference to the annexed figures among which.

In all the figures the same references designate the same elements.

DETAILED DESCRIPTION OF THE MEANS OF IMPLEMENTING THE INVENTION

FIGS. 1, 2, 3 and 4 were previously described, it is therefore pointless going over them again.

Figure 5:
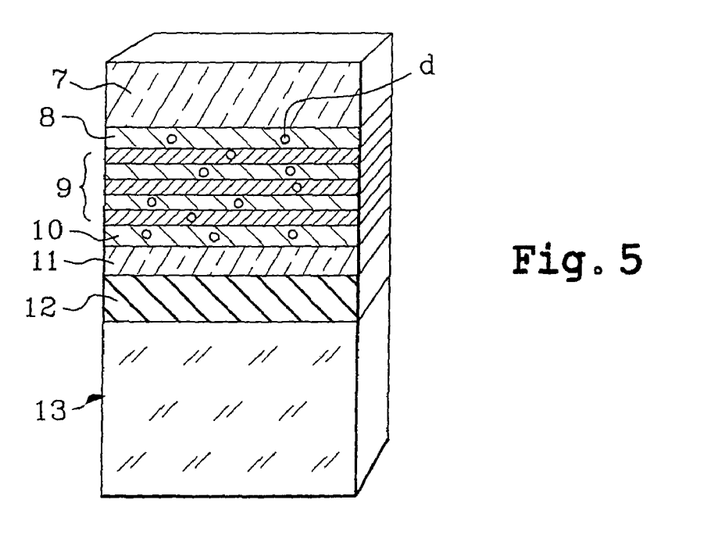
FIG. 5 represents a saturable absorber cavity according to the invention.

FIG. 5 represents a saturable absorber cavity according to the invention. The cavity comprises:
- a front mirror 7 (dielectric deposit or semiconductor mirror);
- a first non-absorbent phase layer 8;
- an absorbent structure 9 composed of quantum wells and barriers separating the quantum wells (this absorbent structure can also be composed of a solid semiconductor layer or by a structure composed of quantum boxes);
- a second non-absorbent phase layer 10;
- a rear mirror 11;
- a welding joint 12; and
- a substrate 13 chosen so as to be a very good heat conductor.

Preferably, a diffusion barrier (not represented in the figure) is located between the soldered joint 12 and the mirror 11.

The non-linear functioning of the component is obtained thanks to the excitonic absorption saturation of the absorbent material. This effect is reinforced by an adaptation of the impedance of the asymmetric micro-cavity formed by the front mirror 7, the absorbent medium 9 and the rear mirror 11. The thickness of the absorbent layer 9 is preferably chosen of sufficiently low value (for example 100 nm) in order to allow a lowering of the energetic commutation threshold. The rear metallic mirror 11 is fixed to a very good heat conducting substrate 13 which advantageously ensures a very good evacuation of the absorbed power. Very good dynamic performance of the component is obtained thanks to the presence of defects d created in the absorbent medium via ion irradiation and without any deterioration of the excitonic absorption.

It is thus necessary to choose a composition of materials that has good absorption saturation properties at the operating wavelength. The absorption saturation properties depend on the energy bands of the material. Preferably, the absorbent material is made using quantum wells. The composition of the quantum wells and the barriers which separate the quantum wells is thus adjusted in order to have a significant excitonic absorption more particularly at the operating wavelength.

A method for manufacturing the component according to the preferred embodiment of the invention will now be described.

Figure 6:
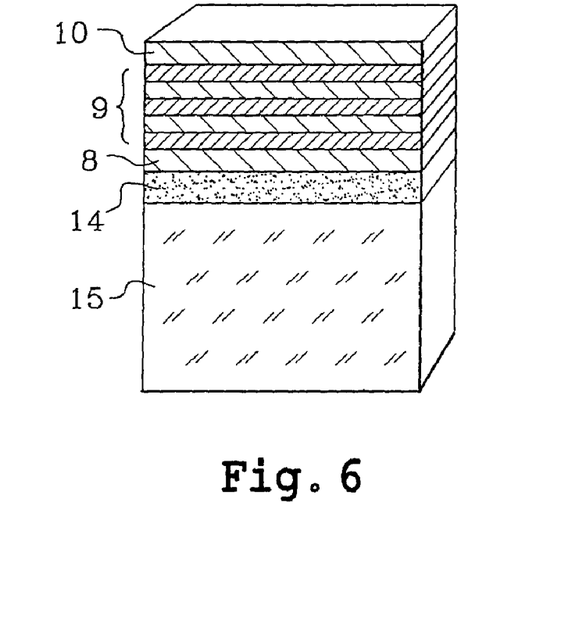
FIG. 6 represents a first stage of manufacturing a saturable absorber cavity according to the first embodiment of the invention.

FIG. 6 represents a first stage of manufacturing the component according to the first embodiment of the invention. The first stage is a growth stage of semiconductive layers on a growth substrate 15, for example an InP substrate. The semiconductive layers that are grown on the substrate 15 are successively:
- a barrier layer 14, for example an InGaAsP layer with a thickness of 250 nm;
- a first phase layer 8, for example an InP layer with a thickness of 250 nm;
- a unit 9 composed of the quantum wells and the barriers separating the quantum wells, this unit being elaborated so as to have the desired excitonic absorption properties at the operating wavelength, for example 1.55 µm;
- a second phase layer 10, for example an InP layer with a thickness of 75 nm.

The number of quantum wells can be, for example, equal to 3, each quantum well having a thickness of 9 nm and each separation barrier between the quantum wells having a thickness of 7 nm. This small absorbent thickness advantageously allows to reduce the heat effects and have saturation power compatible with the available power at high rate.

The growth of semiconductive layers on the substrate 15 is carried out, for example, via MOVPE epitaxy ("Metal Organic Vapor Phase Epitaxy"). A mesh between the crystalline networks of the layers and the substrate must be respected. It is for this reason that the growth of layers is done on an InP substrate and not, for example, on a silicon substrate (Si). The composition of the barrier layer 14 is adjusted so as to obtain an absorption band located, for example, around 1.4 µm and the thicknesses of the quantum wells and the barriers between the quantum wells are thus adjusted so as to obtain a significant excitonic absorption around 1.55 µm.

Figure 7:
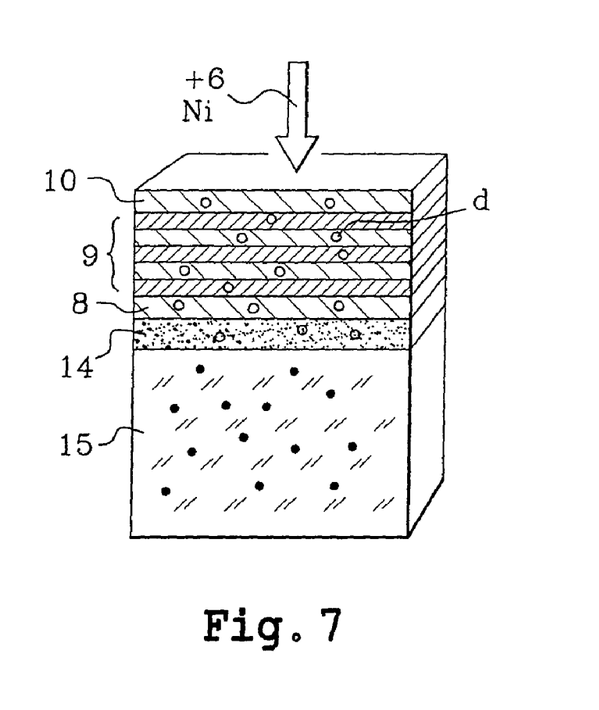
FIG. 7 represents a second stage of manufacturing a saturable absorber cavity according to the first embodiment of the invention.

The material growth stage on the growth substrate 15 is followed by an ion irradiation stage such as is represented in FIG. 7.

Ions, for example $Ni^{+6}$ ions, are sent onto the second phase layer 10. Hence they go through the structure composed of successive layers 10, 9, 8 and 14 to end their travel in the growth substrate 15. During their travel, the ions create crystalline defects d in the absorbent material. The presence of defects in the absorbent material advantageously allow to accelerate the absorption relaxation process without deteriorating the properties of the latter. Indeed, the defects play the role of efficient capture centres for hole-electron pairs. The irradiation energy is adjusted so that the ions go through the entire structure and end their travel in the growth substrate. The latter will then be removed so as to avoid any residual absorption of ions.

The reduction in the time of absorption relaxation is directly linked to the dosage of irradiation, that meaning to the number of ions per surface unit. This technique advantageously allows to adjust the response time of the component after the epitaxial growth stage of the semiconductive layers. Response times inferior to a picosecond can be obtained without deteriorating the excitonic absorption. The ions irradiation dosage of $Ni^{+6}$ can, for example, be equal to $2.10^{11}$ ions per $cm^2$, which results in a component whose response time is substantially equal to 6 ps. The energy of the ions can be equal to 11 MeV, which induces a stopping distance substantially equal to 2 µm. The ions thus go through the entire structure and land in the substrate (which will be removed later on), all residual absorption is thus avoided.

Figure 8:
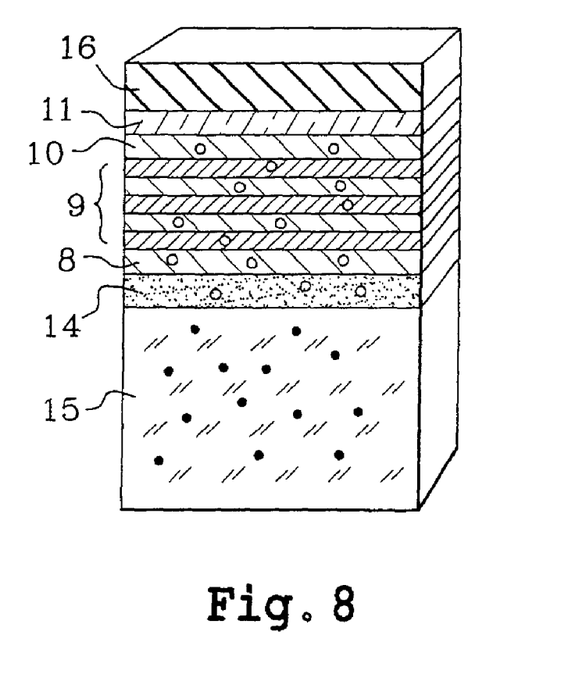
FIG. 8 represents a third stage of manufacturing a saturable absorber cavity according to the first embodiment of the invention.

The depositing of the rear mirror 11 and of a set of metallic layers follows the irradiation stage, as is represented in FIG. 8.

The rear mirror 11 is deposited on the second phase layer 10. The depositing is carried out under vacuum conditions, that meaning, for example, at a pressure substantially equal to $10^{-7}$ Torr. The material used to make the mirror is a metal chosen for its good optical and thermal qualities, that meaning to have a high heat reflectivity and conductivity. A deposit of silver (Ag) or gold (Au) properly respects these two conditions. By way of non-restrictive illustration, a silver mirror with a thickness of 300 nm can be formed on the second phase layer, after deoxidation of the surface of this second layer via chemical aggression based on hydrochloric acid (HCL) diluted to 10%. The reflectivity of the rear mirror is thus equal to approximately 95%.

A set of metallic layers successively composed of a diffusion barrier, a layer of gold and a layer of indium are deposited on the rear mirror 11. Only the layer of indium 16 is represented in FIG. 8. The diffusion barrier can be, for example, a layer of titanium (Ti) with a thickness of 120 nm. The thickness of the layer of gold can be 300 nm and the thickness of the layer of indium can be 1200 nm. The ratio of the deposited layers of gold and indium gives the gold/indium bilayer the composition of 60.2% in weight in indium.

Figure 9:
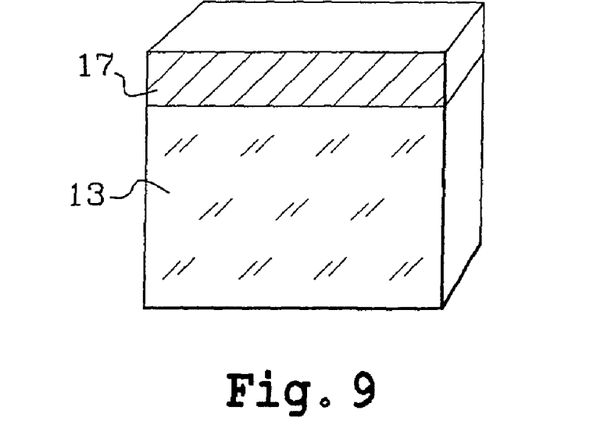
FIG. 9 represents a fourth stage of manufacturing a saturable absorber cavity according to the first embodiment of the invention.

On its side, a host substrate 13, for example a silicon substrate, is covered in a layer of gold 17, as is represented in FIG. 9. The layer of gold is, for example, a layer with a thickness of 300 nm. Prior to the depositing of the layer of gold 17, a thin bonding layer of titanium (Ti) with a thickness of 20 nm can possibly be deposited on the host substrate 13.

Figure 10:
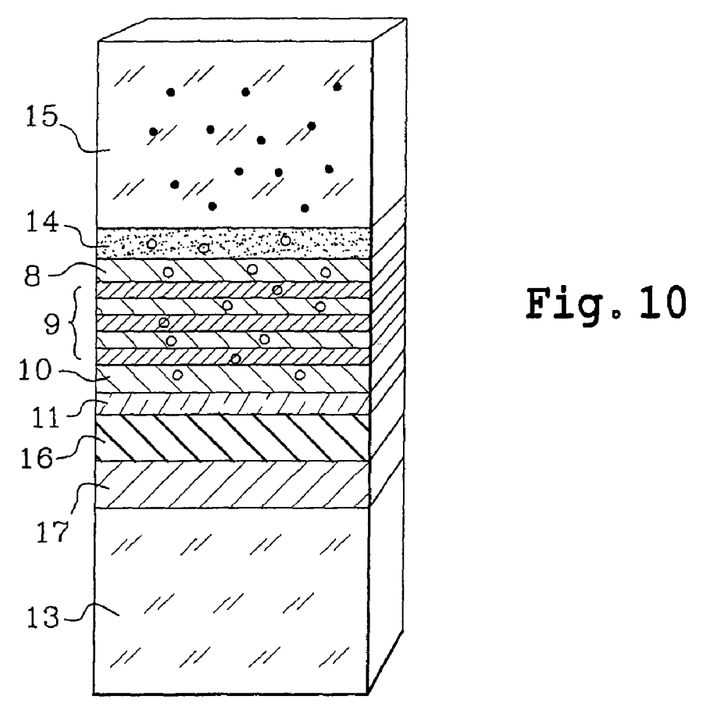
FIG. 10 represents a fifth stage of manufacturing a saturable absorber cavity according to the first embodiment of the invention.

The structure such as is represented in FIG. 8 is thus brought into contact with the structure such as is represented in FIG. 9. The bringing together of the two structures is done, for example, in a clamping device under controlled pressure of approximately 6 bars. As represented in FIG. 10, it is the layers 16 and 17 which are brought into contact one with the other so as to allow, in the conditions detailed below, the creation of a solder via solid-liquid interdiffusion more commonly known under the solder appellation SLID (Solid-Liquid Interdiffusion). The process of fixing via SLID is described in the article entitled "Semiconductor Joining by the Solid-Liquid Interdiffusion (SLID) Process" by Leonard Bernstein, Journal of the Electrochemical Society, P. 1282-1288, December 1966) and in the article entitled "Au—In Bonding Below the Eutectic Temperature" by Chin C., Chen Y. and Goran Matijasevic, IEEE Transactions on Components, Hybrids, and Manufacturing Technology, vol. 16, No 3, May 1993, p. 311-316.

The principle of SLID solder is based on the presence, in the phase diagrams of some intermetallic binary systems, of a solidus jump allowing to obtain, at low temperature (approximately 200° C., inferior to the eutectic temperature), solders whose melting point exceeds twice the temperature of the process (400° C.-700° C.). The condition necessary to have such a binary system is that one of the two metals has a melting point greatly superior to the melting point of the other. The gold/indium couple (Au—In) represents a typical example.

In practical terms, in the simplest case, a layer of different metal is deposited on each of the two substrates to be assembled. Then, the two substrates are brought into close contact by placing the metallic layers one against the other under pressure. The unit is heated to a temperature slightly greater than the melting point of one of the two metals, for example the indium in the case of the gold/indium couple. The latter melts and wets the surface of the other metal (Au). Then, the solid-liquid interdiffusion of the two metals generates a consumption of the liquid phase (In) and the creation of the solid intermetallic compositions, firstly $AuIn_2$ in the case of the gold/indium couple. It must be highlighted that the solidifying of the solder joint is carried out in isothermal conditions inferior to those of the eutectic temperature. This is the point that differentiates the SLID solder from the conventional solders where the alloy is made at a temperature superior to its eutectic temperature and the solidifying of the alloy is obtained during cooling. After complete solidification of the solder joint, the interdiffusion can continue in the solid state until the thermodynamic balance of the system. The ratio of the thicknesses of the layers deposited is defined by the stoichiometry of the finished alloy. This ratio must be chosen so that the re-melting temperature of the finished alloy is substantially superior to the temperature of the soldering process. By way of illustration, in the case of a Au/In system and a process temperature of 200° C., the ratio of the total thicknesses of the indium and gold layers can be taken as 2 to 1, giving a final gold/indium alloy composition of 43.1% in weight in indium. With thermodynamic balance, the final solder of such a system is composed of two solid phases AuIn and $AuIn_2$ marked 12 in FIGS. 5 and 11.

Exempting the Au/In couple, other binary systems can be used for the SLID solder. In order to compose them, a choice can be made, for example, from couples among the following metals whose list is not restrictive:
high melting point: Au, Ag, Pd, Cu;
low melting point: In, Sn, Pb.
The SLID solder can also be a ternary alloy, or greater, with the addition of other elements intended to improve some properties such as, for example, the mechanic properties.

The metallic deposits can be achieved via different vacuum evaporation processes or via electroplating. Generally, the thickness of the solder joint lies between 1 µm and 2 µm.

The heating can be performed via heat or microwave means. In the latter case, only the conductive layers are heated, thus avoiding the annealing of the active layers of the component and considerably diminishing the total time of the assembling process.

As for all metals, indium is very reactive in the liquid state and could aggress the metallic mirror and the active layers. The aforementioned diffusion barrier allows to avoid this aggression. The diffusion barrier could be a layer of titanium, as in the example mentioned above, or a layer of W, Pt, Nb, Cr or Ta, or even a multilayer or an alloy made of at least one of these metals.

The assembling technique via SLID solder advantageously allows to satisfy, among other things, the following three conditions:

I. a good heat conductivity of the component which ensures an efficient evacuation of the heat outside the active layers;

II. a low temperature process which allows to avoid the induction of heavy constraints during the cooling, as well as the healing of the defects created during the irradiation;

III. a good surface uniformity of the obtained component.

Figure 11:
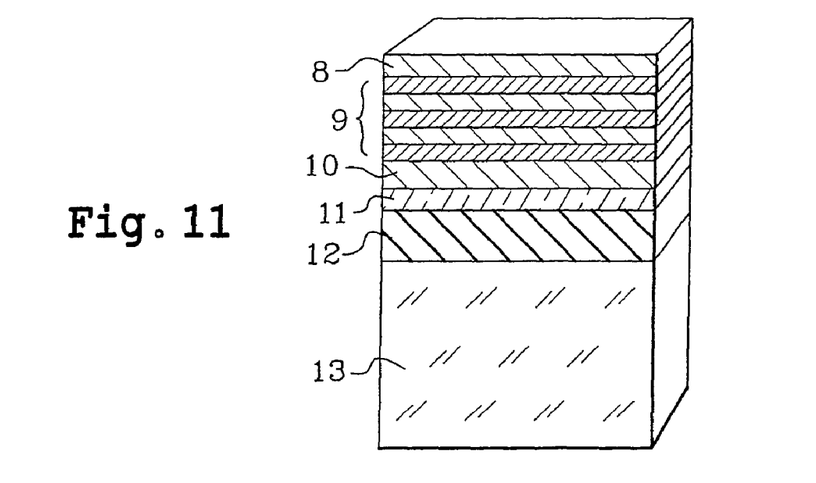
FIG. 11 represents a sixth stage of manufacturing a saturable absorber cavity according to the first embodiment of the invention.

Once the structures have been assembled, the growth substrate 15 in which ions have been implanted and the barrier layer 14 are removed. The structure obtained after the removal of the growth substrate and the barrier layer is represented in FIG. 11.

The removal of the substrate 15 can be done via a mechanical thinning followed by a selective etching, dry or wet. The thinning allows to reduce the thickness of the substrate, for example by approximately 90%, and the chemical etching stage allows to remove what remains of the substrate. The removal of the substrate 15 can also be entirely done via selective chemical etching, dry or wet. The selectivity of the etching process must be high (typically greater than 100) so as to protect the remains of the structure. The barrier layer 14 perfectly fulfils this role. The barrier layer 14 is composed of material different to that of the growth substrate and its thickness is approximately thrice the thickness of the first phase layer.

The removal of the barrier layer 14 is then carried out. An etching, for example a wet chemical etching, allows to remove the barrier layer. The selectivity of the etching process must also be high (typically greater than 1000) so as to protect the cavity.

Figure 12:
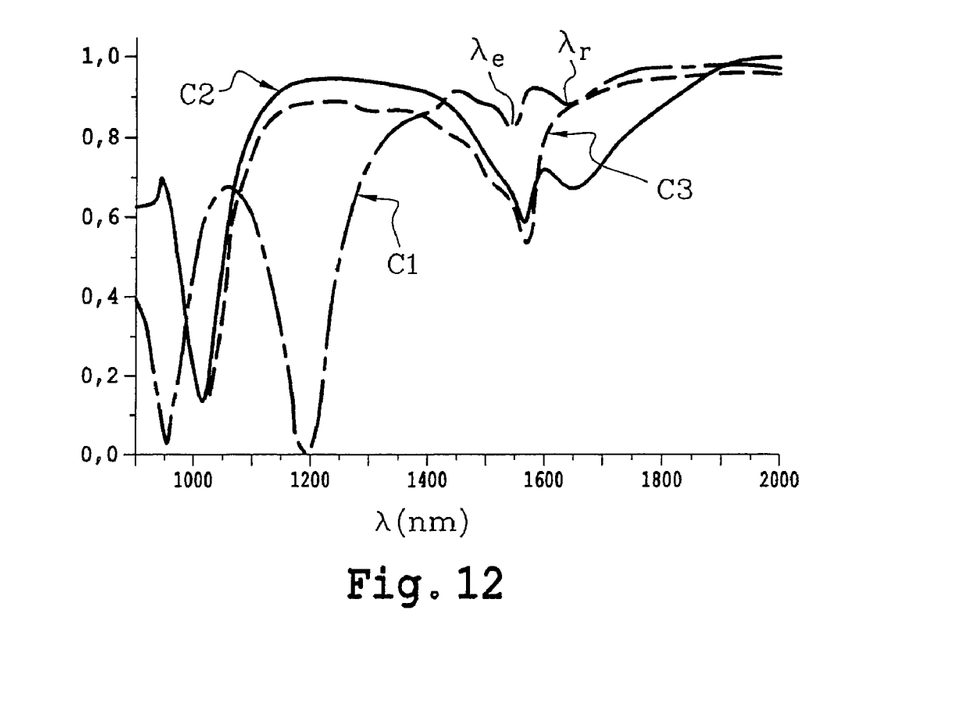
FIG. 12 represents spectral characterisation curves of the saturable absorber cavity according to the first embodiment of the invention.

A setting of the thickness of the cavity, controlled by a spectral characterisation of the component, follows the removal stage of the barrier layer 14. The purpose of this setting is to make the excitonic absorption coincide with the mode of cavity resonance. FIG. 12 represents setting curves C1, C2 and C3 established during the spectral characterisation.

The spectral characterisation firstly allows to localise the spectral position of the excitonic absorption $\lambda_e$ and the spectral position of the mode of cavity resonance $\lambda_r$ (see curve C1). The thickness of the cavity determines the resonance wavelength. The setting is done via a very slow etching of the first phase layer (etching speed for example of approximately $\lambda/100$ per minute). The etching of the first phase layer allows to off set the mode of cavity resonance so that it coincides with the excitonic line. The curves C1, C2 and C3 illustrate the development of the spectre of the component during the etching operation. The adaptation is achieved when the excitonic absorption coincides with the mode of cavity resonance (curve C3). The originality of this stage of the process according to the invention resides in the possibility to control the thickness after the growth and after the depositing of the metallic mirror.

The impedance still has to be adapted, that meaning to cancel the total reflectivity of the component in linear state so as to maximise the commutation contrast. The impedance adaptation stage is performed via the depositing of the front mirror 7. The front mirror 7 is a Bragg mirror with a reflectivity inferior to the reflectivity of the rear mirror 11. The operating wavelength of the Bragg mirror must obviously be centred on that of the excitonic line, so that the mirror does not add any additional phase delay. This ensures that the cavity resonance, which was regulated on the excitonic resonance, will no longer move. The Bragg mirror can be made via a stacking of dielectric layers, for example an alternation of $SiO_2$ and $TiO_2$ layers or an alternation of $SiO_2$ and $Si$ layers. The front mirror 7 is made via a depositing on the first phase layer 8. The reflectivity of the front mirror is chosen to respect the impedance adaptation condition (see equation (1)). The depositing of the front mirror leads to the obtaining of the structure according to the invention represented in FIG. 5. This means of manufacturing which consists in carrying out the depositing of the front mirror as the last stage is preferable according to the invention. Indeed, it allows to choose the adequate deposit (with the reflectivity value which makes the impedance adaptation condition (1)) in order to cancel the reflectivity of the low intensity component and to thus reinforce its commutation contrast.

The component according to the invention as well as its method for manufacturing thus have several advantages compared to a component of the prior art, advantages among which can be cited:
- the means of manufacturing which allows to control the cavity parameters (a choice of a front mirror with higher reflectivity is rendered possible which has the effect of reinforcing the intra-cavity field and of reducing the saturation power);
- a low value of the power absorbed by the absorbent material due to the insignificant thickness of this material (thickness inferior, for example, to 100 nm);
- a very good evacuation of the absorbed power due to the fact that the rear mirror is buried, thanks to the solder joint, in a very good heat conducting substrate;
- the fact that the excitonic line is not deteriorated by the defects created by the ion irradiation;
- the possibility of controlling the response time of the component thanks to a prior calibration of the relation between the response time and the irradiation dosage;
- the fact that the process does not require the use of a transparent growth substrate at the operating wavelength as it is later removed.

Figure 13:
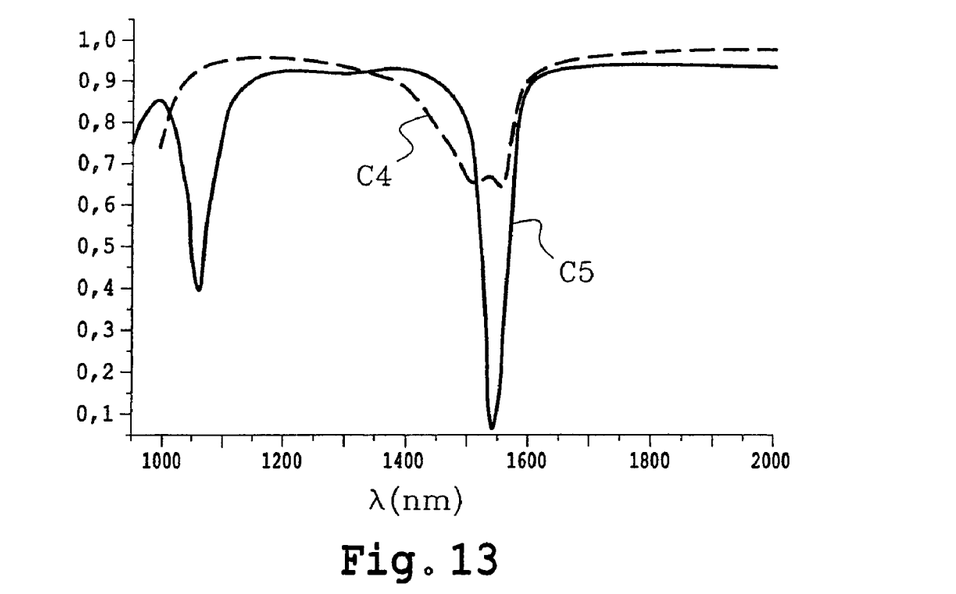
FIG. 13 represents spectral response curves of the saturable absorber cavity according to the first embodiment of the invention.

By way of illustration, FIG. 13 represents the experimental reflectivity curves of the component according to the first embodiment of the invention prior to the depositing of the mirror (curve C4) and after the depositing of the mirror (curve C5).

A second embodiment of the invention will now be described in reference to FIGS. 14 to 17.

Figure 14:
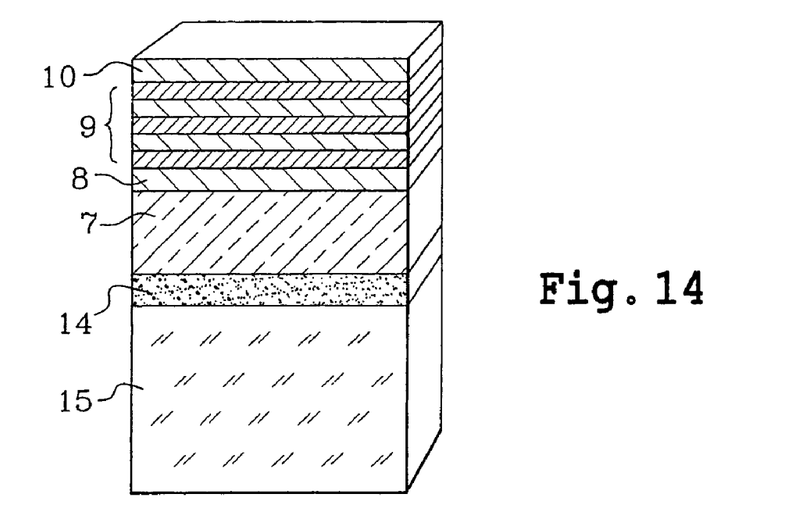
FIG. 14 represents a first stage of manufacturing a saturable absorber cavity according to the second embodiment of the invention.

According to the second embodiment of the invention, the Bragg mirror is an epitaxy semiconductor mirror made during the growth stage of semiconductive layers on the aforementioned substrate 15. The semiconductive layers which were grown on the substrate 15 are thus successively the barrier layer 14, the Bragg mirror 7, the first phase layer 8, the absorbent structure 9 and the second phase layer 10. The Bragg mirror can then be composed, for example, of an alternation of InP and InGaAsP layers.

Figure 15:
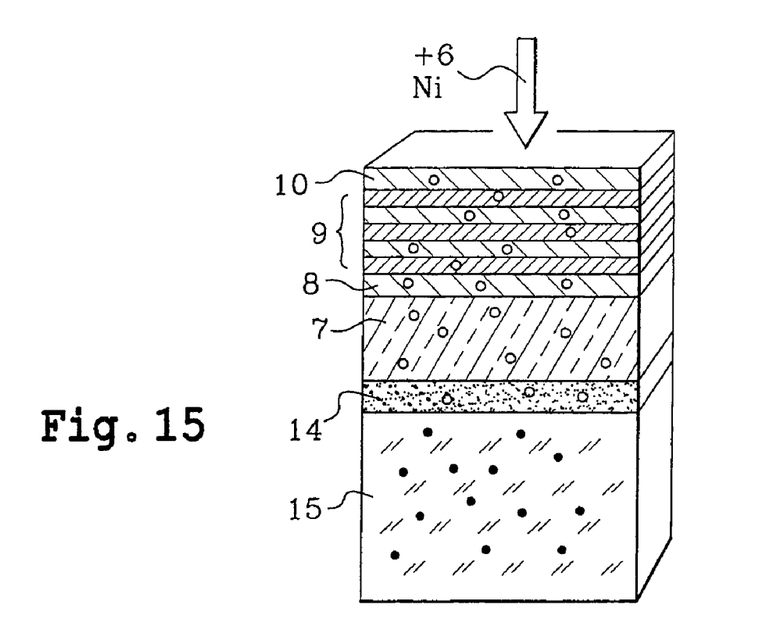
FIG. 15 represents a second stage of manufacturing a saturable absorber cavity according to the second embodiment of the invention.

FIG. 14 represents a structure obtained following the epitaxial growth stage and FIG. 15 represents the irradiation stage of the thus obtained structure.

Figure 16:
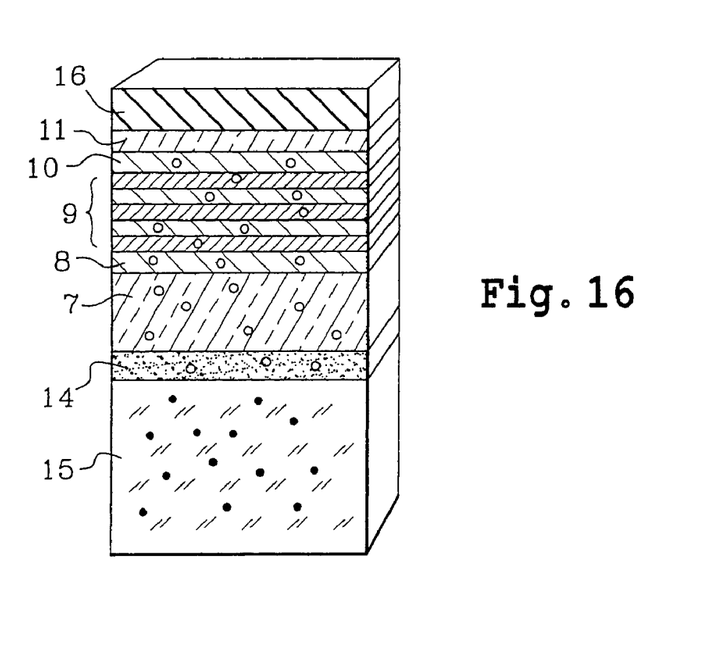
FIG. 16 represents a third stage of manufacturing a saturable absorber cavity according to the second embodiment of the invention.
Figure 17:
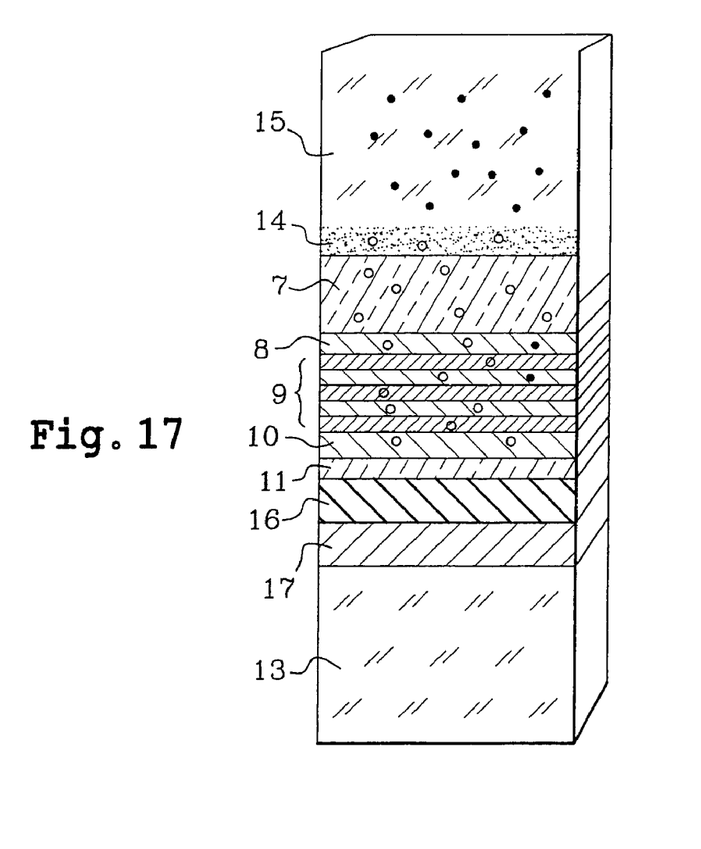
FIG. 17 represents a fourth stage of manufacturing a saturable absorber cavity according to the second embodiment of the invention.

The irradiation stage follows the depositing stage of the rear mirror 11 and of the metallic layer 16 so as to obtain a structure such as represented in FIG. 16. The structure as represented in FIG. 16 is thus brought into contact with the structure as represented in FIG. 9. It is the layers 16 and 17 which are brought into contact one with the other so as to form a SLID solder, as this was previously mentioned for the first embodiment of the invention. The growth substrate 15 and the barrier layer 14 are then removed in order to obtain a saturable absorber component as represented in FIG. 5.

The second embodiment of the invention does not comprise a cavity regulating stage via slow etching of the first phase layer, as is the case according to the first embodiment.

Figure 18:
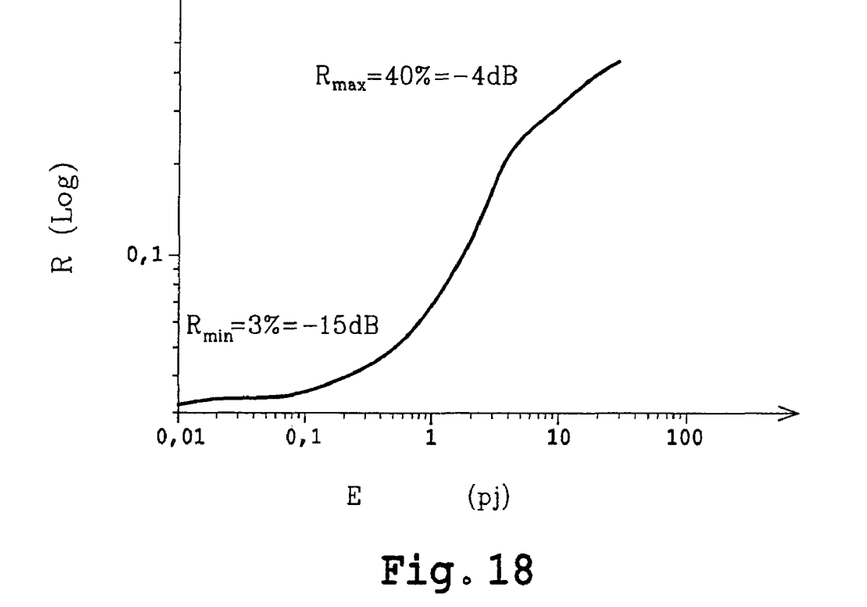
FIG. 18 represents a non-linear transfer curve of a saturable absorber component according to the invention.
Figure 19:
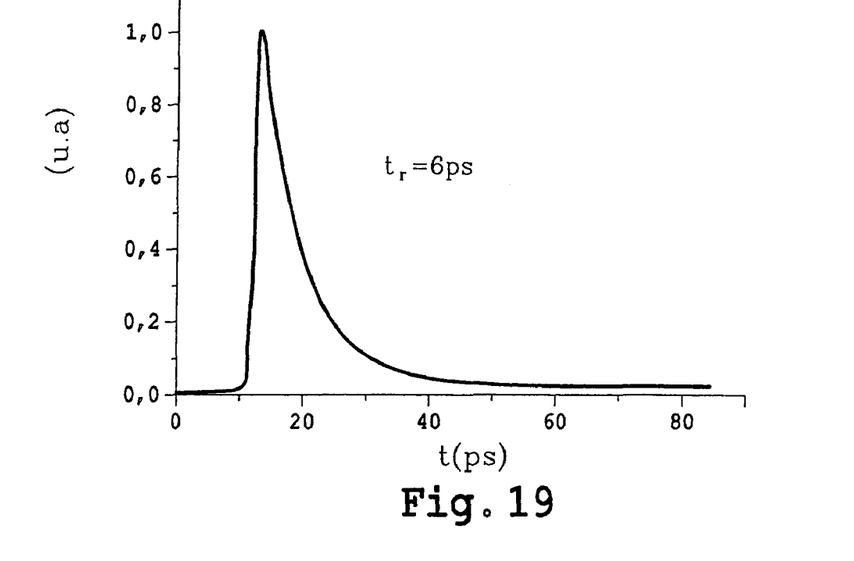
FIG. 19 represents a temporal response curve of a saturable absorber component according to the invention.

FIGS. 18 and 19 illustrate experimental results regarding a component according to the invention.

FIG. 18 represents the reflectivity of the component in a logarithmic scale R(Log) according to the energy via pulses $E_{pulses}$ of a pulse stream at 20 MHz at the wavelength of 1.55 µm. A very low reflectivity $R_{min}$ (3%) is noticed for the low levels of incident energy and a high reflectivity $R_{max}$ (40%) for the high levels of incident signal. The commutation contrast is estimated at 11 dB with a low saturation energy of 1 pJ.

FIG. 19 represents the standardised non-linear signal of the component according to the delay between the excitation signal and the probe signal. The very fast decline of the signal is the sign of an accelerated relaxation process thanks to the ion irradiation. The indicated value (6 ps) is the characteristic time of the exponential decline of the signal, obtained for an irradiation $Ni^+$ at 11 MeV with a dosage of $2.10^{11}$ $cm^{-2}$.

The invention claimed is:

1. A manufacturing method for making saturable absorber components having an absorbent material located between a front mirror and a rear minor, comprising:
   depositing of a first metallic layer on a heat conductive substrate to create a first structure;
   forming on a growth substrate a second structure, by providing on the growth substrate the absorbent material, the rear mirror, and a second metallic layer, at least said absorbent material having a thickness less than 100 nm;
   bringing into contact the first structure and the second metallic layer;
   soldering by solid-liquid interdiffusion the first structure to the second metallic layer by forming a eutectic film that extends over the entire surface of the first structure; and
   depositing a diffusion barrier on the rear minor, and depositing a layer of gold on the diffusion barrier.

2. The manufacturing method set forth in claim 1, further comprising providing a barrier layer and a first phase layer on the growth substrate, and providing a second phase layer on the absorbent material.

3. The method set forth in claim 2, further comprising:
before providing the rear minor on the second phase layer, ion irradiating the second phase layer so as to create crystalline defects in the absorbent material.

4. The method set forth in claim 2, further comprising:
successively removing the growth substrate and the barrier layer; and, thereafter
etching the first phase layer, said etching being controlled by a spectral characterization of the component.

5. The method set forth in claim 3, further comprising:
successively removing the growth substrate and the barrier layer; and, thereafter
etching the first phase layer, said etching being controlled by a spectral characterization of the component.

6. The method set forth in claim 4, further comprising:
depositing the front mirror after said etching.

7. The method set forth in claim 6, further comprising:
providing dielectric layers to form the front mirror as a Bragg mirror.

8. The method set forth in claim 7, wherein the providing of dielectric layers comprises:
alternately providing $SiO_2$ and $TiO_2$ layers or $SiO_2$ and Si layers.

9. The method set forth in claim 1, further comprising:
epitaxially growing on the growth substrate successively, a barrier layer, a front mirror, a first phase layer, the absorbent material, a second phase layer, the rear mirror, and the second metallic layer to form the second structure.

10. The method set forth in claim 9, further comprising:
before growing the rear mirror on the second phase layer, ion irradiating the second phase layer so as to create crystalline defects in the absorbent material.

11. The method set forth in claim 10, wherein said irradiating comprises:
irradiating with an irradiation energy adjusted so that the ions end travel in the growth substrate.

12. The method set forth in claim 11, wherein said irradiating comprises:
irradiating with $Ni^{+6}$ ions.

13. The method set forth in claim 1, further comprising:
forming the front mirror as a Bragg mirror made via alternation of InP and InGaAsP layers.

14. The method of saturable absorber components set forth in claim 1, further comprising:
successively removing the growth substrate and a barrier layer predeposited on the growth substrate.

15. The method set forth in claim 14, wherein the removing comprises:
removing the growth substrate via mechanical polishing and then via etching.

16. The method set forth in claim 14, wherein the removing comprises:
removing the barrier layer via etching.

17. The method set forth in claim 1, wherein the depositing of the first metallic layer comprises a preceding step of:
depositing a bonding layer on the heat conductive substrate.

18. The method set forth in claim 1, further comprising:
forming the first metallic layer from at least one of Au, Ag, Pd, and Cu; and
forming the second metallic layer from any one of In, Sn, and Pb.

19. The method set forth in claim 1, further comprising:
depositing for the absorbent material a succession of quantum wells and barriers separating the quantum wells.

20. The method set forth in claim 1, further comprising:
depositing for the rear mirror a layer of gold (Au) or silver (Ag) layer.

* * * * *

UNITED STATES PATENT AND TRADEMARK OFFICE
CERTIFICATE OF CORRECTION

PATENT NO. : 7,900,810 B2
APPLICATION NO. : 12/352417
DATED : March 8, 2011
INVENTOR(S) : Jean-Louis Oudar et al.

It is certified that error appears in the above-identified patent and that said Letters Patent is hereby corrected as shown below:

Column 6, line 16, "around 1.4 µm" should read --around 1.41 µm--

Signed and Sealed this
Twelfth Day of July, 2011

David J. Kappos
*Director of the United States Patent and Trademark Office*